United States Patent
Soto et al.

(10) Patent No.: US 7,428,382 B2
(45) Date of Patent: Sep. 23, 2008

(54) SYSTEM AND METHOD FOR PERFORMING IN-SERVICE FIBER OPTIC NETWORK CERTIFICATION

(76) Inventors: Alexander I. Soto, 7673 Hazard Center Dr., San Diego, CA (US) 92108; Walter G. Soto, 2020 Costero Hermoso, San Clemente, CA (US) 92673

( * ) Notice: Subject to any disclaimer, the term of this patent is extended or adjusted under 35 U.S.C. 154(b) by 521 days.

(21) Appl. No.: 10/793,546

(22) Filed: Mar. 3, 2004

(65) Prior Publication Data
US 2004/0247316 A1    Dec. 9, 2004

Related U.S. Application Data

(60) Provisional application No. 60/451,614, filed on Mar. 3, 2003.

(51) Int. Cl.
*H04B 10/08*    (2006.01)
*H04B 17/00*    (2006.01)

(52) U.S. Cl. .......................................... 398/20; 398/21
(58) Field of Classification Search ............... 398/20, 398/21, 25
See application file for complete search history.

(56) References Cited

U.S. PATENT DOCUMENTS

| | | | | |
|---|---|---|---|---|
| 4,658,394 | A | * | 4/1987 | Cheng et al. .................. 398/70 |
| 5,311,344 | A | * | 5/1994 | Bohn et al. .................... 398/72 |
| 5,453,827 | A |   | 9/1995 | Lee |
| 5,548,432 | A | * | 8/1996 | Clarke et al. ................ 398/100 |
| 6,611,322 | B1 | * | 8/2003 | Nakayama et al. ......... 356/73.1 |
| 6,864,968 | B2 | * | 3/2005 | Mori et al. .................. 356/73.1 |
| 7,027,730 | B2 | * | 4/2006 | Nagayama et al. ............ 398/37 |
| 7,242,862 | B2 | * | 7/2007 | Saunders et al. .............. 398/30 |
| 2003/0007215 | A1 | * | 1/2003 | Snawerdt ..................... 359/152 |
| 2003/0113118 | A1 |   | 6/2003 | Bartur |
| 2004/0004709 | A1 | * | 1/2004 | Pitchforth, Jr. ............. 356/73.1 |
| 2004/0070750 | A1 |   | 4/2004 | Iannelli |
| 2004/0146305 | A1 |   | 7/2004 | Neubelt |
| 2004/0208501 | A1 | * | 10/2004 | Saunders et al. ............... 398/9 |
| 2004/0232919 | A1 | * | 11/2004 | Lacey ......................... 324/533 |

FOREIGN PATENT DOCUMENTS

WO    WO9724822 A1    7/1997

OTHER PUBLICATIONS everything2.com/?node=TLV, Sep. 26, 2002.*
"Physics, Part II" by Halliday and Resnick, John Wiley & Sons, 1962, pp. 998-115 and 1013-1023.*

(Continued)

*Primary Examiner*—Shi K Li
(74) *Attorney, Agent, or Firm*—James Albert Ward

(57) ABSTRACT

A system and method for performing an in-service optical time domain reflectometry (OTDR) and/or insertion loss (IL) measurement(s) using the same wavelength as the data traffic for point-to-point or point-to-multipoint optical fiber networks. The OTDR or IL sessions are multiplexed in accordance with the network protocol in use to avoid any distortion of data transmissions.

75 Claims, 7 Drawing Sheets

OTHER PUBLICATIONS

Pilhan et al., Novel in-service supervisory system using OTDR for long-haul WDM transmission link including cascaded in-line EDF'As, Photonics Tech-nology Letters, IEEE, vol. 13, Issue 10, Date: Oct. 2001, pp. 1136-1138, Digital Object Identifier 10.1109/68.950760.

Wang et al., In-service fault locating and supervisory CATV optical distribu-tion network using WDM-based OTDR and optical switches, Optical Fiber Communication—vol. 3420 Winston I. Way, Franklin F. Tong, Alan E. Willner, Editors Jun. 1998.

Cox et al., First field demonstration of in-service fault location/ supervisory us-ing optical time domain reflectometry, IEE Journal, Publication Date: Jan. 18, 1990, vol. 26, Issue: 2, pp. 110-112, CODEN: ELLEAK, INSPEC Accession No. 3581073.

Chun-Kit Chan, A Novel In-Service Surveillance Scheme for Optically Amplified Transmission System, IEEE Photonics Technology Letters, Nov. 1997, 1520-1522, vol. 9, No. 11.

Kuniaki Tanaka, In-service Individual Line Monitoring . . . , ECOC 97, Sep. 22-25, 1997, 295-298, Conference Publication No. 448.

Fumihiko Yamamoto, Allowable Received OTDR Light Power for In-Service Measurement in Lightwave SCM Systems, Journal of Lightwave Technology, Mar. 2000, 286-294, vol. 18, No. 3.

I-Yu Kuo, In-Service OTDR-Monitoring-Supported Fiber-Bragg-Grating Optical Add-Drop Multiplexers, IEEE Photonics Technology Letters, Jun. 2002, 867-869, vol. 14, No. 6.

* cited by examiner

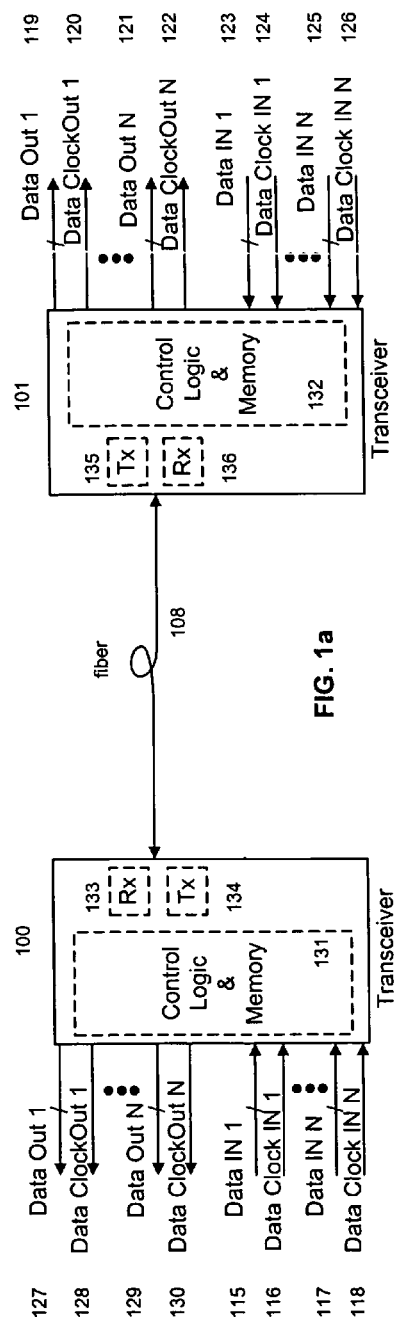
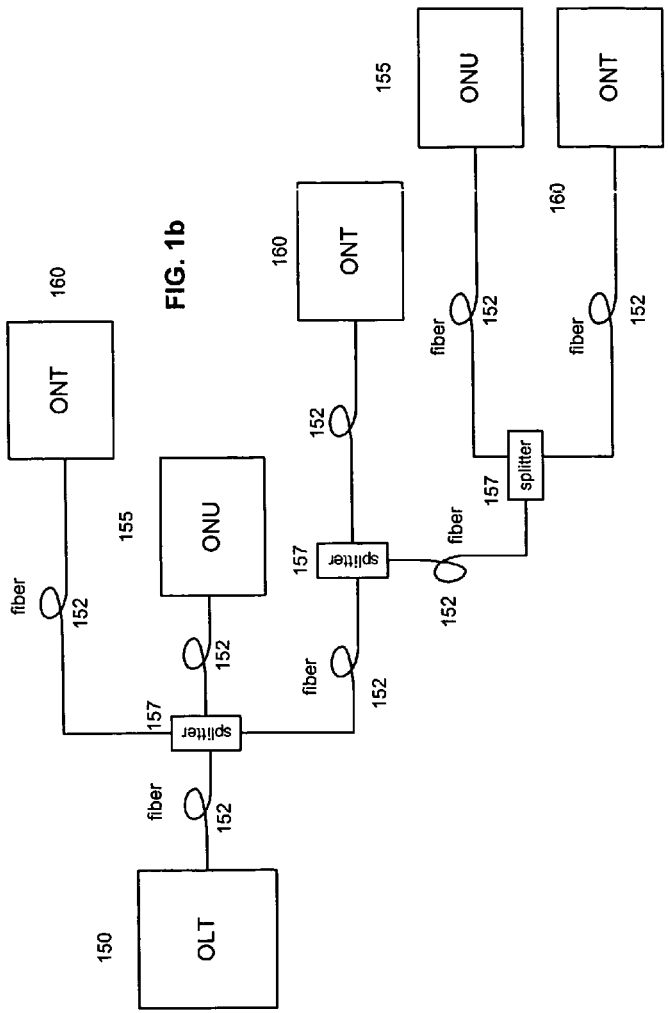
FIG. 1a
FIG. 1b

SYSTEM AND METHOD FOR PERFORMING IN-SERVICE FIBER OPTIC NETWORK CERTIFICATION

RELATED APPLICATION

The present application claims priority to Unites States Provisional Application Ser. No. 60/451,614, filed Mar. 3, 2003, the entire contents of which are herein incorporated by reference in their entirety.

BACKGROUND OF THE INVENTION

Maintenance and related administration to support customer's service level agreements (SLA) are a large part of Operator's operational expenses (OpEx) for optical fiber networks. The labor and material costs for diagnosing maintenance problems within a fiber network can dominate Operator's budgets and impact customer's SLAs negatively. To manage these expenses, Operators have deployed redundant networks that have multiple links with automatic loss of link detection and switchover capabilities to insure SLAs and other mission critical services are maintained.

Usually when optical fibers are first deployed, highly skilled personnel with expensive fiber test equipment are assigned the task of ensuring and verify desired fiber plant loss budgets are met. This process of fiber plant deployment occurs before service is enabled to customers or during out-of-service periods, which are closely monitored and sometimes restricted due to customer's SLA constraints. All Long Haul, Metro and Access fiber optic based services are deployed in this manner.

Once a customer's service is enabled, Operators are responsible for the maintenance and servicing required by optical fiber links as they degrade over time. This places extra cost burden on the fiber plants to provide field testability. Typically this field testability requires extra splitters at ends of a fiber link to allow the connection of optical test equipment. Each additional splitter not only means more capital expense (CapEx) is incurred by the Operator but it also takes away precious dBs from the optical loss budget. Operators value greatly its fiber plant loss budgets where reach and other margin related policies are used to differentiate its service offerings at a fiber link level. Operators thus use non-traffic affecting optical test methods like Optical Time Domain Reflectometry (OTDR) using maintenance wavelengths of 1625 nm that is separate and independent from all other wavelengths used to carry customer service traffic. This is an expense capital and labor-intensive method for routine fiber maintenance checks while ensuring service outages do not occur.

Therefore performing In-Service OTDR maintenance procedure without the need for additional maintenance splitters and without the need for a separate maintenance wavelength is highly desirable to Operators due to realized OpEx, CapEx and Optical Loss budget savings.

BRIEF SUMMARY OF THE INVENTION

A system and method for multiplexing an in-service optical time domain reflectometry (ISOTDR) session using the same wavelength as the data traffic for point-to-point or point-to-multipoint optical fiber networks while not impacting data transmission.

The present invention contemplates a method for performing an In-Service Optical Time-Domain Reflectometry (ISOTDR) comprising initiating said ISOTDR, configuring said ISOTDR, multiplexing said ISOTDR, maintaining bit lock during said ISOTDR and reporting results obtained from said ISOTDR. With respect to said initiating, the present invention further contemplates processing operational management control interface (OMCI) messages, wherein said OMCI messages indicate a request to perform said ISOTDR. With respect to said configuring, the present invention further contemplates processing operational management control interface (OMCI) messages, wherein said OMCI messages configure both TC Framing and PMD layers to perform said ISOTDR. With respect to said multiplexing, the present invention further contemplates conforming an ISOTDR packet to an allocated bandwidth.

BRIEF DESCRIPTION OF THE DRAWINGS

FIG. 1a illustrates a fiber optic data network in accordance with an embodiment of the present invention;

FIG. 1b illustrates a block diagram of a point-to-multipoint system in accordance with an embodiment of the present invention;

DETAILED DESCRIPTION OF THE INVENTION

Figure 2A:
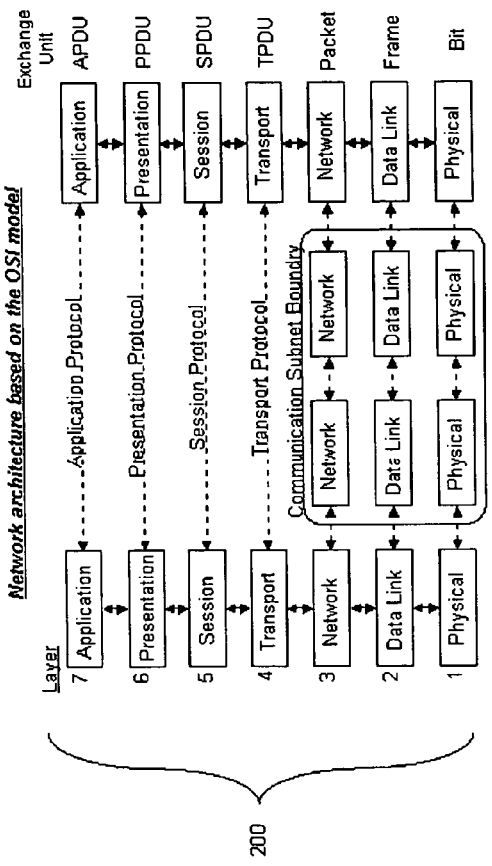
FIG. 2a illustrates the OSI 7-layered model in accordance with an embodiment of the present invention.

The present invention can coexist with existing network protocols or be engineered into future network protocols to determine the condition or characteristics of fiber links that comprise a fiber optic network. Conventional approaches used to determine the condition of fiber links include Optical Time-Domain Reflectometry (OTDR) and Optical Loss Test (also known as Insertion Loss Test). The Telecommunications Industry Association has developed many standards covering the OTDR and Optical Loss Test approaches and these standards, though not specifically disclosed, are included herein by reference.

The OTDR approach or method involves transmitting a light pulse, or a series of light pulses, of a desired wavelength into one end of the fiber under test and then measuring, from the same end of the fiber, the fraction of light that is reflected back due to Rayleigh scattering and Fresnel reflection. The intensity of the reflected light is measured and integrated as a function of time, and is plotted as a function of fiber length. OTDR is used for estimating the fiber and connection losses as well as locating faults, such as breaks in an optical fiber.

In addition to a single fiber, OTDR can also be used with multiple fibers. For example, when several fibers are connected to form an installed fiber plant, OTDR can be used to characterize optical fiber and optical connection properties along the entire length of the fiber plant. A fiber plant consists of optical fiber cables, connectors, splices, mounting panels, jumper cables, and other passive components. However, a fiber plant does not include active components, such as optical transmitters or receivers.

As described above, in addition to OTDR, Optical Loss Test is another method used to determine the condition of fiber links. The Optical Loss Test method involves transmitting a light pulse or a continuous light signal, of known power or strength, and of a desired wavelength into a first end of the fiber under test and then measuring the received optical power or amount of light received at a second end of the fiber. The difference between the transmitted optical power and the received optical power is called insertion loss or optical loss. The insertion loss can indicate a fault in a fiber link if the value is great, indicating the received optical power is too low to ensure accurate signal transmission. As such, knowledge of the insertion loss between any combination of transmitters and receivers on a fiber link enables the light output power setting on the transmitter to be set at a minimum or optimum setting to ensure accurate signal transmission while saving power and extending the life of the transmitter.

Both OTDR and Optical/Insertion Loss Testing are performed when the fiber optic network is "out of service." For example, during initial fiber plant deployment, network technicians use opto-electronic instruments to perform OTDR or Optical/Insertion Loss Testing after each splice or fiber connection is made. The term "out of service" means normal data communication on the fiber optic network is non-operational. As noted in the Background of the Invention as set forth above, conventional maintenance and servicing of fiber optic networks increases overall network costs and decreases network efficiency.

Unlike conventional methods and devices, the present invention uses control of optical transmitters and receivers along with the network protocol of a fiber optic network to characterize fiber and optical connection properties along the entire length of the fiber plant while the fiber optic network is "in-service." The term "in-service" means normal data communication on the network is operational. Since the invention uses the network protocol and a plurality of transmitters and receivers of a given fiber optic network while the network is operational or in-service to perform an OTDR test and/or an Optical/Insertion Loss Test, the systems and methods of the present invention are respectively referred to herein as In-Service Optical Time-Domain Reflectometry (ISOTDR) and In-Service Insertion Loss (ISIL). As will be shown, in additional to using either an ISOTDR system/method or ISIL system/method to determine the condition or characteristics of fiber links, the ISOTDR and ISIL systems/methods can also be combined or performed simultaneously. This combination is referred to herein as ISOTDR-ISIL.

As previously disclosed, the present invention can coexist with existing network protocols or be engineered into future network protocols, which can be conceptualized using the Open Systems Interconnection (OSI) reference model. The OSI reference model was established by the International Standards Organization (ISO) and is hereby included by reference (ISO/IEC 7498-1). The following description is provided to better understand the flow of data through the OSI model.

Referring to the drawings, wherein like reference numerals designate identical or corresponding parts throughout the several views and embodiments, FIG. 2a shows an embodiment of data flow in the OSI 7-layered model 200.

As shown in FIG. 2a, the OSI 7-layered model 200 is an abstract model of a networking system divided into layers, numbered 1 through 7. Within each layer, one or more entities implement its functionality. As such, each layer provides certain services to the other layers adjacent to it, thereby forming a modular framework and allowing diverse entities to communicate with each other. As defined herein, entities are active protocol elements in each layer that are typically implemented by means of a software process. Entities in the same layer on different computers or terminals are called peer entities. In general, terminals are network apparatus that send and/or receive signals on an end of a fiber link. At each layer of the OSI model 200, there may be more than one entity that may implement different protocols. In addition, one entity can communicate with one or more entities in the same or adjacent layers.

Figure 2B:
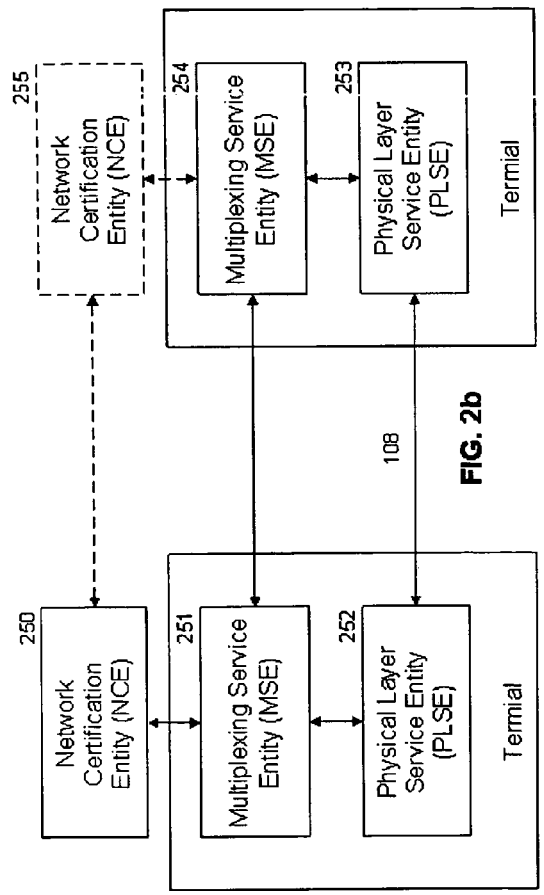
FIG. 2b illustrates various entities of a networking system in accordance with an embodiment of the present invention.

In one embodiment of the invention, shown in FIG. 2b, a networking system includes the following entities: a network certification entity (NCE) 250,255, a multiplexing service entity (MSE) 251,254 and a physical layer service entity (PLSE) 252,253, wherein each of these entities may be implemented in hardware, software or a combination thereof. Although the functions associated with each entity and the interactions between entities are described herein without reference to a specific communication network protocol, it is understood that a variety of communication network protocols may be used and, therefore, are included within the scope of the claimed invention.

In general, the physical layer service entity (PLSE) 252, 253 coordinates the functions required to perform the ISOTDR, ISIL and/or ISOTDR-ISIL methods and exists at the physical layer of the OSI model. The multiplexing service entity (MSE) 251,254 is served by the physical layer service entity (PLSE) 252,253 and performs the function of scheduling times and coordinating events needed to perform the methods of the invention. The multiplexing service entity (MSE) 251,254 may exist at the same OSI layer as the physical layer service entity 253,253 or at an OSI layer above it. The network certification entity (NCE) 250,255 is served by the multiplexing service entity (MSE) 251,254 and is responsible for initiating, establishing appropriate values, and receiving the results of the various test methods of the invention, as well as possibly issuing certification reports. The network certification entity (NCE) 250,255 may exist at the same OSI layer as the multiplexing service entity (MSE) 251,254 or at an OSI layer above it.

In one embodiment of the invention, at least one NCE 250,255 exists on the fiber optic network and may, or may not, exist on some or all terminals of the network. In general, terminals are network apparatus that send and/or receive signals on an end of a fiber link. MSEs 251,254 and PLSEs 252,253 exist on every capable terminal of the fiber optic network. As defined herein, capable terminals are terminals on the fiber optic network capable of the methods of the invention.

As disclosed above, the NCE 250,255 is generally responsible for initiating an ISOTDR, ISIL or ISOTDR-ISIL method request and establishing values needed to perform the desired method. The NCE 250,255 establishes values, such as intensity or optical power of one or more transmissions of light and their durations, as well as the delay (relative to start of the light transmissions), duration and the sampling resolution of light transmission measurements for the desired method, to ensure proper results of the targeted fiber link 108 under test. These values are referred hereto as method parameters.

To identify, and thereby evaluate, the target fiber link 108, the NCE 250,255 discovers all terminal addresses, relative to the network protocol, that are capable of performing the ISOTDR, ISIL or ISOTDR-ISIL methods. The NCE 250,255 uses the services of the network protocol to determine the capable terminal addresses. If the NCE 250, 255 is unable to determine which capable terminals share the same fiber link, then the NCE 250, 255 requests a peer or service entity to disclose which capable terminals share the same fiber link within the fiber optic network. After the capable terminals are identified, the NCE 250, 255 is then able to map all capable terminal addresses 256, 257 to every capable end-point on the fiber optic network.

In an alternate embodiment, the NCE 250,255 may use the services of the network protocol to determine which capable terminals share the same fiber link. As previously disclosed, this allows the NCE 250,255 to map all capable terminal addresses to every capable end-point on the fiber optic network. Once the NCE 250,255 knows which capable terminals share the same fiber link, the NCE 250,255 then identifies the specific capable terminal address that will be involved in the desired fiber link test and initiates the desired test method.

To initiate the test method, the NCE 250,255 sends the addresses of the identified capable terminals and method parameters to the MSE 251,254 via the network protocol services. As a result of initiating the method, the NCE 250, 255 receives results of the desired test method from the MSE 251,254.

To properly analyze and interpret the results of the ISOTDR, ISIL and/or ISOTDR-ISIL test methods, the NCE 250, 255 may initiate a plurality of ISOTDR, ISIL and/or ISOTDR-ISIL methods with varying method parameters to obtain all permutations of capable terminal connections within the fiber optic network. In addition, the NCE 250,255 may also use the results obtained from peer NCEs 255,250 that have previously performed the ISOTDR, ISIL and/or ISOTDR-ISIL methods on the fiber optic network.

In addition to the above-referenced functions/services, the NCE 250,255 may also provide certification report services to peer entities or service entities that reside at any OSI layer, such as those shown in FIG. 2a. These certification report services include comprehensive and exhaustive descriptions of the state or condition of individual fiber links within a given fiber optic network during in-service periods or partial in-service periods. A partial in-service period is defined as the period wherein a specific fiber link has failed causing out-of-service periods for that part of the network. The NCE's certification report services cover a variety of network components and characteristics including, but not limited to, individual fiber links, such as the location and loss profile of fiber splices, fiber connectors, and optical splitters.

In an alternate embodiment of the invention, the NCE 250, 255 is also able to determine a terminal's effective transceiver optical coupling efficiency within a given fiber plant. The resulting certification report can thereby be used to aid in the process of reconciling and mitigating discrepancies of fault isolation and/or differences between method results and non-method results obtained with special fiber test equipment.

In general, the NCE certification report services may cause peer or service entities to initiate operational, administrative or maintenance events, such as alarms, flags, plots, human resource dispatches, service layer agreement (SLA) updates or request for procurement orders, that are used by Service Providers or Network Administrators to manage a given fiber optic network in a financially optimal manner. In addition, the NCE services provide Service Providers and Network Administrators with the ability to minimize the overall capital and/or operational expenses of a fiber optic network during in-service periods, during periods when service outages are being repaired and/or during periods when services are being reestablished.

The NCE services also provide Service Providers and Network Administrators with the ability to monitor an entire fiber optic network to ensure proper physical fiber or perimeter security is maintained at all times. For example, if a malicious user or individual attaches an apparatus to a fiber link designed to intercept the optical signals in an effort to unlawfully discover information, then the NCE services are used to detect the fiber tampering, generate the appropriate security response, and identify the location of the malicious tampering event, all of which is performed with the fiber optic network still in-service.

In one embodiment of the invention, the NCE 250, 255 may detect a fiber tampering event has occurred by periodically comparing new ISOTDR, ISIL and/or ISOTDR-ISIL test method results with previously stored test method results, assuming the stored method results cover the entire fiber optic network and the fiber links tested by the new method results eventually cycle over the entire fiber optic network. If the results of NCE's comparison show any discrepancies or differences between the previously stored method results, then a tampering event can be declared and the NCE 250,255 can provide the approximate location of the tampering, based on the analysis of the latest method results, to requesting entities who can then suspend network services to affected terminals.

As previously disclosed, the MSE 251,254 performs the functions of scheduling times and coordinating events that are needed to perform the various test methods. In general, the MSE 251,254 receives an initiated method request from a NCE 250,255. If the received method request is not addressed to the PLSE 252, 253 on the same terminal as the MSE 251,254, then the method request is forwarded to the appropriate peer MSE 254,251 with the addressed PLSE via the network protocol. In this regard, the MSE 251,254 may use the network protocol to translate addresses. However, if the received request pertains to the MSE 251,254, then the MSE 251,254 schedules, via the network protocol, the optimal time to perform the requested method on the fiber optic network. The MSE 251,254 determines the optimal time via services of the network protocol at or below the layer of the MSE 251, 254 and from deductions made by the MSE 251,254 from the method parameters of the received requested test method. An example of a MSE deduction includes, but is not limited to, the amount of time necessary to accomplish the requested method taking into account the line rate of the fiber link(s) involved.

If the requested method is an ISIL or ISOTDR-ISIL method, then the MSE 251,254 also schedules a time, via the network protocol, to receive the results of the insertion loss measurements. In addition, any peer MSE(s) 254,251 that are also involved with the requested method are also informed, via the network protocol, of the scheduled time that the requested method will be performed. Further, the MSE 251, 254 also sends to the PLSE 252,253, on the same terminal as the MSE 251,254, the method parameters and the capable terminal addresses received from the method request in time for the now scheduled method to be performed by the PLSE 252,253 via the network protocol.

As disclosed above, and referring back to FIG. 2b, a PLSE coordinates the functions required to perform the ISOTDR, ISIL and ISOTDR-ISIL methods and exists at the physical layer of the OSI model. The PLSE 252,253 receives from the MSE 251,254 a request to perform an ISOTDR, ISIL or ISOTDR-ISIL method together with the associated method parameters and capable terminal addresses involved in performing the requested method. In general, the PLSE 252,253 performs the requested method by transmitting necessary light transmissions, disabling light transmission and, in some instances, measuring the light transmissions. Further, the PLSE 252,253 may also measure the light transmissions from another PLSE that shares the fiber link.

In addition to the OSI model, the present invention will now be described with respect to a high-level fiber optic network. Referring to FIG. 1*a*, a embodiment of a high-level fiber optic data network in accordance with the present invention includes a first transceiver 100 in communication with a second transceiver 101 via a fiber 108. As best seen in FIG. 1*a*, the first transceiver 100 and the second transceiver 101 include transmitter circuitry (Tx) 134, 135 to convert electrical data input signals into modulated light signals for transmission over the fiber 108. In addition, the first transceiver 100 and the second transceiver 101 also include receiver circuitry (Rx) 133, 136 to convert optical signals received via the fiber 108 into electrical signals and to detect and recover encoded data and/or clock signals. Furthermore, first transceiver 100 and second transceiver 101 may contain a micro controller and/or other control logic and memory 131, 132 necessary for network protocol operation. Although the illustrated and described embodiments of the transceivers 100, 101 include a micro controller and/or other control logic and memory in the same package or device as the transmitter circuitry 134, 135 and receiver circuitry 133, 136, other embodiments of transceivers may also be used and are included within the scope of the claimed invention.

As shown in FIG. 1*a*, the first transceiver 100 transmits/receives data to/from the second transceiver 101 in the form of modulated optical light signals of known wavelength via the optical fiber 108. The transmission mode of the data sent over the optical fiber 108 may be continuous, burst or both burst and continuous modes. Both transceivers 100,101 may transmit the same wavelength provided that the light signals are polarized and wherein the polarization of light transmitted from one of the transceivers is perpendicular to the polarization of the light transmitted by the other transceiver. Alternatively, if no polarization is used, then a single wavelength can be used by both transceivers 100, 101 provided the transmissions are in accordance with a time-division multiplexing scheme or similar protocol.

In another embodiment, wavelength-division multiplexing, generally defined as any technique by which two optical signals having different wavelengths may be simultaneously transmitted bi-directionally with one wavelength used in each direction over a single fiber, may also be used and is included within the scope of the claimed invention. In yet another embodiment, dense wavelength-division multiplexing, generally defined as any technique by which more than two optical signals having different wavelengths may be simultaneously transmitted bi-directionally with more than one wavelength used in each direction over a single fiber with each wavelength unique to a direction, may also be used and is included within the scope of the claimed invention. For example, if wavelength division multiplexing is employed, the first transceiver 100 may transmit data to the second transceiver 101 utilizing a first wavelength of modulated light conveyed via the fiber 108 and, similarly, the second transceiver 101 may transmit data via the same fiber 108 to the first transceiver 100 utilizing a second wavelength of modulated light conveyed via the same fiber 108. Because only a single fiber is used, this type of transmission system is commonly referred to as a bi-directional transmission system. Although the fiber optic network illustrated in FIG. 1*a* includes a first transceiver 100 in communication with a second transceiver 101 via a single fiber 108, other embodiments of fiber optic networks, such as those having a first transceiver in communication with a plurality of transceivers via a plurality of fibers (not shown), may also be used and are included within the scope of the claimed invention.

As shown in FIG. 1*a*, electrical data input signals (Data IN 1) 115, as well as any optional clock signal (Data Clock IN 1) 116, are routed to the transceiver 100 from an outside data source for processing by the control logic and memory 131, which must adhere to an in-use network protocol, for transmission by the transmitter circuitry 134. The resulting modulated light signals produced from the first transceiver's 100 transmitter 134 are then conveyed to the second transceiver 101 via the fiber 108. The second transceiver 101, in turn, receives the modulated light signals via the receiver circuitry 136, converts the light signals to electrical signals, processes the electrical signals via the control logic and memory 132, which must adhere to an in-use network protocol and, optionally, outputs the electrical data output signals (Data Out 1) 119, as well as any optional clock signals (Data Clock Out 1) 120.

Similarly, the second transceiver 101 receives electrical data input signals (Data IN 1) 123, as well as any optional clock signals (Data Clock IN) 124, from an outside data source for processing by the control logic and memory 132, which must adhere to an in-use network protocol, for transmission by the transmitter circuitry 135. The resulting modulated light signals produced from the second transceiver's 101 transmitter 135 are then conveyed to the first transceiver 100 via the optical fiber 108. The first transceiver 100, in turn, receives the modulated light signals via the receiver circuitry 133, converts the light signals to electrical signals, processes the electrical signals via the control logic and memory 131, which must adhere to an in-use network protocol, and, optionally, outputs the electrical data output signals (Data Out 1) 127, as well as any optional clock signals (Data Clock Out 1) 128.

It will be appreciated that the fiber optic data network of the present invention may also include a plurality of electrical input and clock input signals, denoted herein as Data IN N 117/125 and Data Clock IN N 118/126, respectively, and a plurality of electrical output and clock output signals, denoted herein as Data Out N 129/121 and Data Clock Out N 130/122, respectively. The information provided by the plurality of electrical input signals may or may not be used by a given transceiver to transmit information via the fiber 108 and, likewise, the information received via the fiber 108 by a given transceiver may or may not be outputted by the plurality of electrical output signals. The plurality of electrical signals denoted above can be combined to form data plane or control plane bus(es) for input and output signals respectively. In an embodiment of the invention, the plurality of electrical data input signals and electrical data output signals are used by logic devices or other devices located outside a given transceiver to communicate with the transceiver's control logic and memory, transmit circuitry, and/or receive circuitry.

Figure 3:
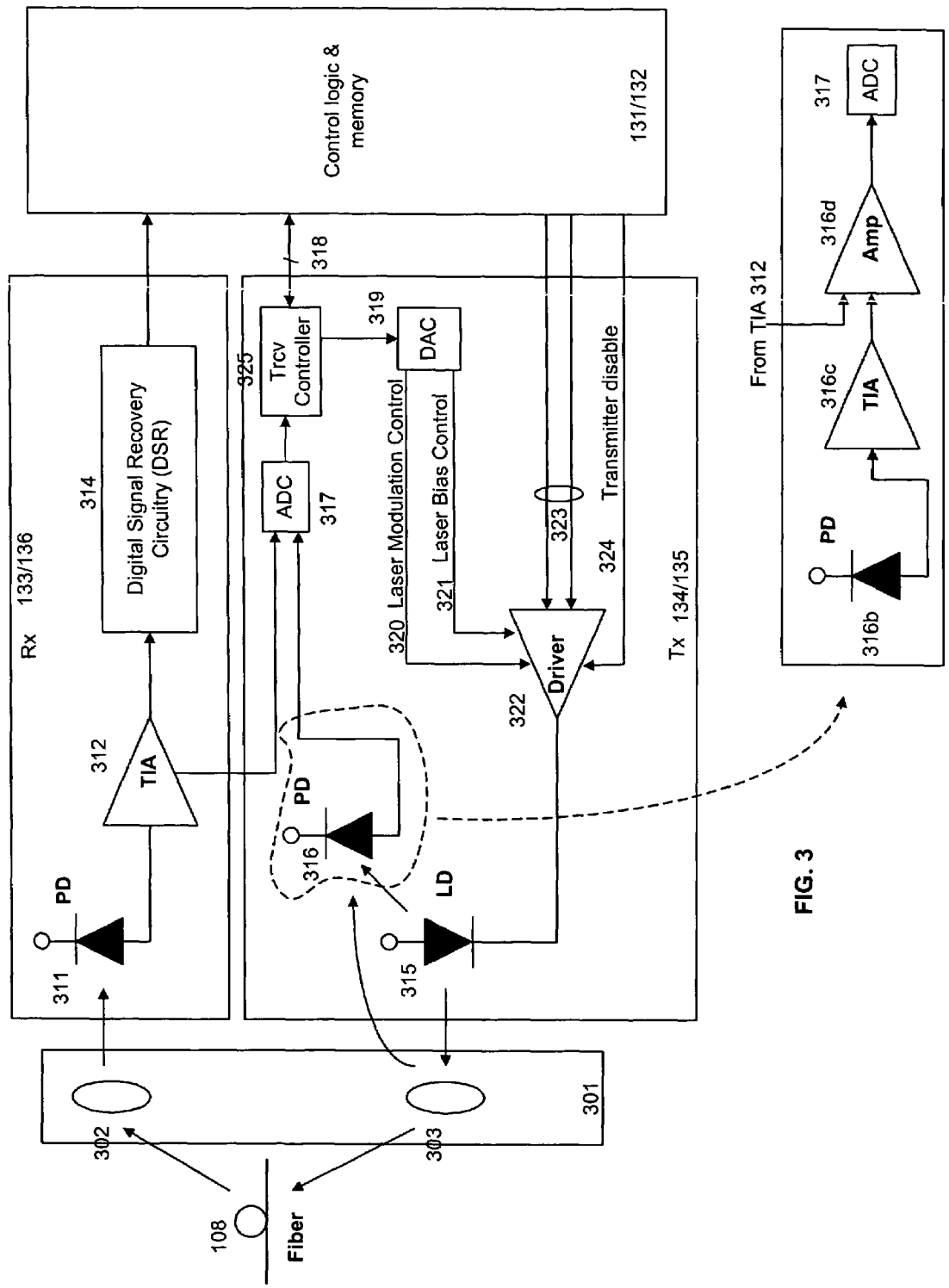
FIG. 3 illustrates circuitry and components of a portion of a fiber optic data network in accordance with an embodiment of the present invention.

Since the PLSE as preliminarily discussed, is located at the physical layer in the OSI model and the responsibilities of the PLSE include transmit and received functions, embodiments of the PLSE include control of transmit and receive circuitry. Referring to FIG. 3 and FIG. 1*a*, the control logic and memory 131,132, the transmit circuitry 134,135 and the receive circuitry 133,136 of the transceivers 100,101 are further illustrated and now discussed. When desired, the control logic and memory 131,132 transmits fiber data output via electrical signals 323 to the laser Driver (Driver) 322. The Driver 322 drives the Laser Diode (LD) 315, which transmits light with a modulation and bias current in response to electrical signals 323. The modulation current typically corresponds to high data values, such as logic 1, and a bias current typically corresponds to low data values, such as logic 0. As such, the LD 315 transmits light in response to the modulation and bias current.

The light emitted from LD 315 travels into the fiber 108 with the aid of the fiber optic interface 301. The fiber optic interface 301 optically couples the LD 315 and the PhotoDetector or PhotoDiode (PD) 311 to the fiber 108. The fiber optic interface 301 may include, but is not limited to, optical filters, beam splitters, and lenses. The fiber optic interface 301, as depicted in this embodiment of the invention, includes lenses 303,302 to aid in the visualization of the optical coupling provided by the interface 301.

Referring now to the transceiver 100,101 of FIG. 3 and FIG. 1a, the transceiver 100,101 receives data in the form of light transmissions along fiber 108 that travel through the fiber optic interface 301 and are received by the PD 311. In response, the PD 311 provides a photocurrent to the TransImpedance Amplifier (TIA) 312 that converts the photocurrent into an electrical voltage signal. The electrical voltage signal from the TIA 312 is then sent to the Digital Signal Recovery (DSR) circuitry 314, which converts the electrical voltage signals into digital signals. The DSR circuitry 314 further detects digital waveforms within the electrical voltage signal and outputs a well-defined digital waveform. Finally, the digital waveform is sent as received fiber data input to the control logic & memory 131,132.

In general, light transmissions of the transceiver 100,101 are controlled by the control logic & memory 131,132. As shown in FIG. 3, the control logic and memory 131,132 communicates with the transceiver controller (trcv controller) 325 via a digital Input/Output bus 318. The trcv controller 325 is composed of a combination of hardware and software. The trcv controller 325 controls the laser modulation control signal 320 and bias control signal 321 via a signal conversion performed by a Digital to Analog Converter (DAC) 319. The laser modulation and bias control signals communicate with the Driver 322 and, thereby, control the upper and lower bounds of the output light intensity of the LD 315. This is accomplished by setting upper bounds on lower bounds on the laser modulation and bias signals provided by the Driver 322 to the LD 315. The light transmissions from the LD 315 may be terminated or enabled via the transmitter disable signal 324, which is an electrical signal sent to the Driver 322 via the control logic and memory 131,132. Therefore, in view of the combination of electrical signal(s) 323, laser modulation control signal(s) 320, laser bias control signal(s) 321 and the transmitter disable signal(s) 324, the control logic & memory 131,132 virtually has complete control over light transmissions of the transceiver 100,101.

With regard to the test methods of the present invention, a transceiver performing the ISOTDR or ISOTDR-ISIL methods measures the reflected light transmissions via the PhotoDetector or PhotoDiode (PD) 316. In general, light transmissions from the LD 315 travel into the fiber 108 and continually produce reflected light back to the LD 315 as the light transmissions travel along fiber 108. The PD 316 is optimally positioned to receive these reflected light transmissions or reflections. The PD 316 is typically referred to as a monitor photo diode that performs the function of monitoring the output power of the LD 315. As discussed above, the PD 316 receives the reflected light which it then converts to an analog electric signal and transmits this electric signal to the Analog to Digital Converter (ADC) 317. The ADC 317 further converts the analog signal to a digital signal and transmits the digital signal to the trcv controller 325. Under the direction of the control logic and memory 131,132, the trcv controller 325 then sends the digital signal/data, via the digital I/O bus 318, to the control logic and memory 131,132 as the received measured OTDR data.

In addition to the above functions, the transceiver 101,100 must also be able to measure the light transmissions from other optically linked transceivers performing the ISIL or ISOTDR-ISIL test methods. These light transmissions are measured by the PD 311 and are converted to photocurrent that is then sent to the TIA 312. The internal circuitry of TIA 312 mirrors the average photocurrent and converts this average to a proportional voltage that is often referred to as Receive Sense Sensitivity Indicator (RSSI), which is sent to the ADC 317. The ADC 317 converts the RSSI signal to digital data that is then sent to the trcv controller 325. Under the direction of the control logic & memory 132,131, the trcv controller 325 then sends the digital data via the digital I/O bus 318 to the control logic and memory 132,131 as the received measured ISIL data.

The accuracy of the measurements in accordance with the ISOTDR, ISIL and ISOTDR-ISIL methods are significant to the ultimate usefulness of the results of these test methods. It will be appreciated that alternative measurement circuitry, not disclosed herein but also included within the scope of the claimed invention, can greatly increase the accuracy of the measurements. An embodiment of an alternative measurement circuitry is now discussed with reference to FIG. 3. The alternative circuitry involves replacing the PD 316 with: a more sensitive PhotoDetector or PhotoDiode (PD) 316b, a TransImpedance Amplifier (TIA) 316c and a linear Amplifier (Amp) 316d. The replacement PD 316b performs the same functions as the original PD 316 and, thereby, provides photocurrent to the TIA 316c. The TIA 316c converts the photocurrent to an electrical voltage signal that is then sent to the Amp 316d. The Amp 316d, which can receive RSSI signals from the TIA 312 as well, provides increased resolution of these electrical voltage signals to the ADC 317. The rest of the process continues as previously discussed. In this regard, the ADC 317 converts the electrical voltage signals to digital data that is then sent to the trcv controller 325. Under the direction of the control logic & memory 131,132, the trcv controller 325 sends the digital data to the control logic and memory 131,132, via the digital I/O bus 318, as either received measured OTDR data or received measured ISIL data, depending upon the measurement source.

The transceivers 100,101 shown in FIG. 1a and FIG. 3 are an example of an embodiment of PLSEs that can be utilized in accordance with discussions above. In this regard, an ISOTDR, ISIL or ISOTDR-ISIL method request would be received via the (Data IN 1) 115,123 signals or alternatively via some set of (Data IN N) 117,125 signals by the control logic & memory 131,132. The control logic & memory 131,132, being composed of a combination of hardware and software processes, performs the coordination of functions required for the execution of the received test method.

After the transceiver 100,101 receives the requested method and the scheduled time to perform the method has arrived, the control logic and memory 131,132 transmits information or a notification message, in a format consistent with the network protocol, to notify other linked transceivers 101,100 that the requested method is being performed. The notification message may also be used to notify the appropriate capable terminals of their obligation to measure the requested method being performed. The notification message is transmitted by the control logic & memory 131,132 as digital fiber data output. Then the control logic & memory 131,132 uses its control over the LD 315, as previously disclosed, to transmit the light transmissions as prescribed by the method parameters of the requested method.

Following the light transmissions, the control logic & memory 131,132 disables further light transmissions from the transceiver via signal 324. If the requested method is an ISOTDR or ISOTDR-ISIL method, then the control logic & memory 131,132 communicates with the trcv controller 325 to receive measured OTDR data in the manner discussed above. The control logic & memory 131,132 then records the measurements as prescribed by the method parameters. If the requested method is an ISIL method, then the control logic and memory 131,132 performs no recording of measurements and waits until the end of the duration of the measurement performed by other link transceivers. The control logic & memory 131,132 knows the duration from the method parameters.

Once the measurement duration has passed, the control logic & memory 131,132 may then transmit a restore clock sequence as fiber data output and may resume the data transmissions that are part of the network protocol. If the transceiver transmits data in continuous mode communication, then the restore clock sequence is needed to restore bit level synchronization with linked transceivers. The restore clock sequence is a pattern of data values designed to ensure timing recovery by the DSR 314. If, however, the transceiver transmits data in burst mode communication, then the transceiver may transmit a restore clock sequence or, alternatively, allow the DSR of linked transceivers to obtain bit level synchronization with the resumption of fiber data output transmissions that are part of the network protocol. The control logic and memory 131,132 conveys the stored measurements or results of the method back to the MSE that it servers, as per the responsibility of the PLSE, via the network protocols.

If the transceiver 101,100 receives a digital notification that an ISOTDR, ISIL or ISOTDR-ISIL measurement is being performed by a linked transceiver, then the control logic and memory 132,131 may ignore the received data for the remaining duration of the method being performed so as to not cause conflicts or errors with the network protocol. The duration of the method may be conveyed in the notification message or may be conveyed by the MSE that this transceiver serves, as per the responsibility of the PLSE, via services of the network protocol. If the method being performed by the linked transceiver is an ISIL or ISOTDR-ISIL method, then the transceiver is required to measure the ISIL or ISOTDR-ISIL light transmissions as part of the method. In this regard, the control logic and memory 132,131 communicates to the trcv controller 325 to receive measured ISIL data in the manner discussed above. The control logic and memory records the measurements, as prescribed by the method parameters and for the duration prescribed by the method parameters. The pertinent information from the method parameters may be conveyed to the transceiver 101,100 via the notification message or by the MSE that this transceiver serves, as per the responsibility of the PLSE, via services of the network protocol. After the measurement period and then once the DSR 314 of the transceiver has achieved bit synchronization, the control logic and memory 131,132 resumes receiving fiber data input as part of the network protocol. The control logic & memory 132,131 conveys the stored measurements or results of the method back to the MSE that it servers, as per the responsibility of the PLSE, via the network protocols.

For wavelength division multiplexing and/or dense wavelength—division multiplexing employed on an embodiment of a fiber optic network having a transceiver performing a method of the invention as described above, the receive data path of the transceiver is not affected by the method being performed due to the differences in transmit and receive wavelengths employed by the network. Likewise, the transmit path of transceivers linked via fiber to a transceiver performing a method are not affected by the method being performed due to the same differences in transmit and receive wavelengths employed by the network. Thus, it will be appreciated that in keeping with the in-service nature of the methods of the invention a transceiver performing a method of the invention may continue to receive, and linked transceivers may continue to transmit, normal network communications. Furthermore, it will be appreciated that a transceiver linked via fiber to a transceiver performing a method may, in lieu of normal network communications, perform a method of the invention that may overlap partially or completely in time with the original transceiver performing a method of the invention.

In addition to the previously described fiber optic data network of FIG. 1*a*, there are a number of alternative network configurations also included within the scope of the present invention. For example, FIG. 1*b* illustrates an embodiment of a passive optical network (PON), wherein the first transceiver 100 and the second transceiver 101 of FIG. 1*a* correspond to the optical line terminator (OLT) 150 and the optical networking unit (ONU) 155, and/or optical networking terminal (ONT) 160, of FIG. 1*b*, respectively. PON(s) may be configured in either a point-to-point network architecture, wherein one OLT 150 is connected to one ONT 160 or ONU 155, or a point-to-multipoint network architecture, wherein one OLT 150 is connected to a plurality of ONT(s) 160 and/or ONU(s) 155. In one embodiment of a point-to-multipoint fiber optic data network, as shown in FIG. 1*b*, the OLT 150 is in communication with multiple ONTs/ONUs 160, 155 via a plurality of optical fibers 152. In this regard, the fiber 152 extending externally from the OLT 150 is combined with the fibers 152 extending externally from the ONTs/ONUs 160, 155 by one or more passive optical splitters 157. Alternate network configurations, including alternate embodiments of point-to-multipoint networks, though not specifically described herein, are also included within the scope of the claimed invention.

An embodiment of a PON network in accordance with an embodiment of the present invention will now be discussed. As disclosed herein, PONs are a high bandwidth point-to-multipoint optical fiber network, which rely on light-waves for information transfer. Depending on where the PON terminates, the system can be described as fiber-to-the-curb (FTTC), fiber-to-the-building (FTTB), or fiber-to-the-home (FTTH). There exists a master-slave relationship between a PON's OLT and ONT or ONU, respectively, due to the nature of point-to-multipoint systems. In this regard, the OLT is the master of the PON, which is the main reason why the OLT usually resides in the central office. The central office manages the PON via management entities such as Network Operations Control (NOC) entities. The NOC entities exist at the OSI application layer along with other management entities that are used by Service Providers and Network Administrators to manage the PON. Some common management entities known to service providers are Customer SLA Management, Security Management and Procurement Management entities. All these entities may have a business need to access the test method results of the present invention. To access these results, the entities may request service to a peer NCE.

As mentioned previously, NCEs exchange service requests and method results with MSEs via the network protocol. For this embodiment of the invention, the network protocol is similar to the International Telecommunication Union's (ITU) Gigabit PON G.984.3 Transmission Convergence (GTC) protocol stack, included herein by reference, as shown in FIG. 4, which is patterned after the OSI model.

Figure 4:
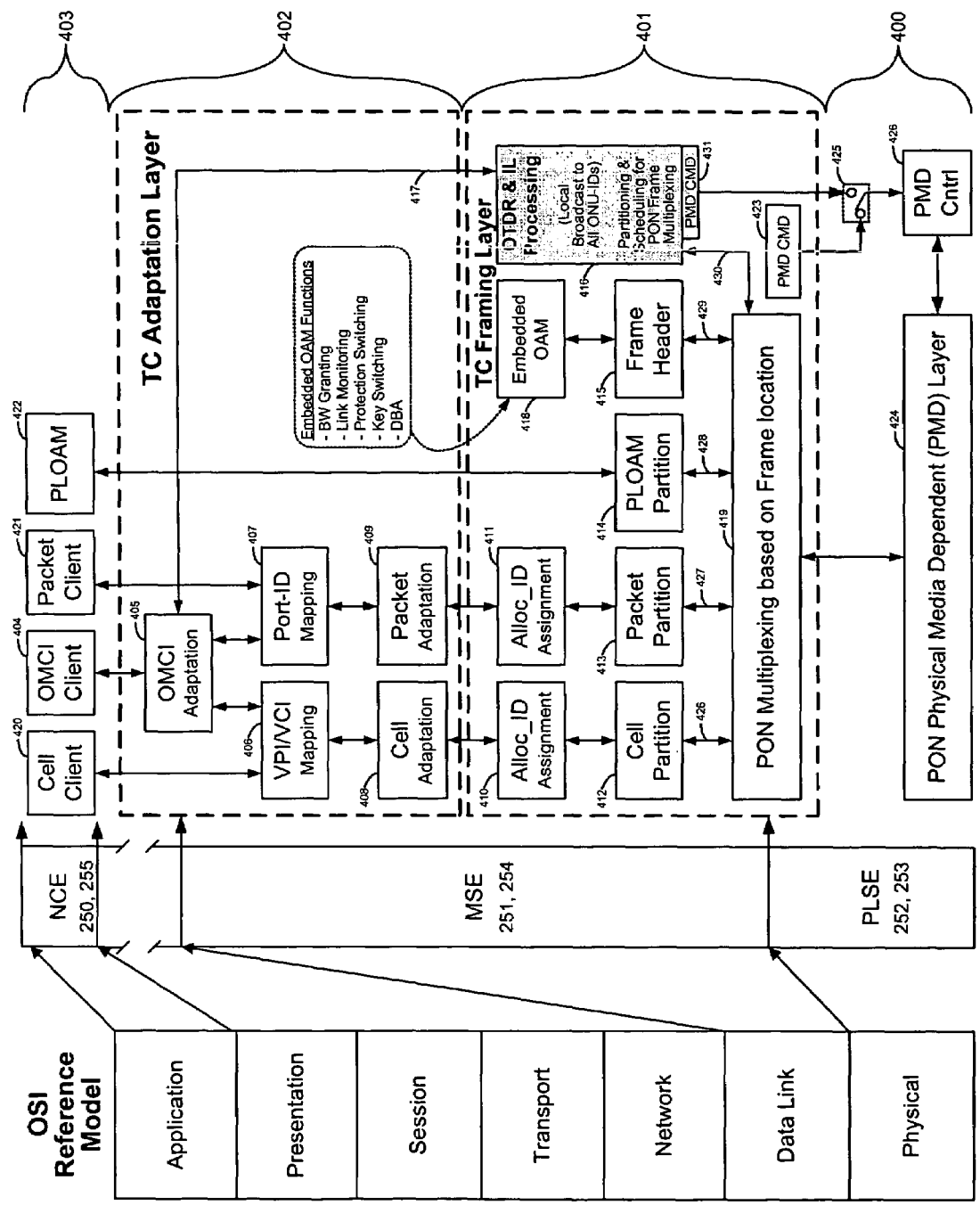
FIG. 4 illustrates a diagrammatic flow chart of the layers of a point-to-multipoint system in accordance with an embodiment of the present invention.

FIG. 4 shows how the PON protocol passes information between the OSI physical layer and application layer. Between these layers, the PLSE resides at the physical layer, the MSE resides at the Data Link layer, and the NCE resides at the application layer. As mentioned previously, the interaction between NCE, MSE and PLSE entities results in a flow of information across the network protocol. In other words, the PLSE is realized by the Physical Media Dependent (PMD) Layer 400 along with PMD control functions that are performed by the Transmission Convergence (TC) Framing Layer 401. The MSE is realized by the (TC) Framing Layer 401 and TC Adaptation Layer 402. Finally, the NCE is realized by the terminating client agents 403.

Remote management of a PON is initiated by the NOC and typically occurs through the Operations Management Channel Interface (OMCI) 404 client entity. The OMCI provides a uniform system of managing higher service defining layers. The OMCI passes either control cell or packet information thru the OMCI Adaptation block 405 and, finally, maps to either cell or packet streams through the VPI/VCI Mapping block 406 or thru the Port-ID mapping block 407. Each control cell or control packet is then adapted 408, 409 to the appropriate PON frame format, as outlined in FIG. 6 and FIG. 7 and discussed in further detail below. Next, either data or control information is assigned an Allocation Identification tag 410,411 before the final stream partitioning 412,413 is performed. This allows the control or user data traffic to be multiplexed correctly in the appropriate PON frame location 419.

In addition to the Cell or Packet Client entities 420,421, which reside at the application layer and are combined with OMCI information flow in either the cell or packet multiplexing paths, there is also local Physical Layer Operation and Administration Management (PLOAM) 422 information that is partitioned and multiplexed into the PON frame 419. Since all information bits must be multiplexed into the PON frame 419, any ISOTDR, ISIL or ISOTDR-ISIL method must also be scheduled 416 and bandwidth consumed by the methods must be accounted or scheduled for in the embedded Operation Administration and Management (OAM) 418 of the TC framing layer 401. This scheduling is performed by an MSE responding to an NCE request.

Since PON's share a common wavelength in the downstream or the upstream data traffic, a unique ISOTDR, ISIL or ISOTDR-ISIL broadcast type field 416, provided by the OMCI adaptation block 405 via network protocol exchange 417, must be used so that the PON can perform the test method measurements while preventing false resynchronization events to occur within either the OLT or ONU/Ts. To ensure correct PMD layer configuration, the PMD control 426 must switch 425 sources 423,431 in accordance to the correct PON frame alignment for either the downstream or the upstream direction, shown in FIG. 6 and FIG. 7. The PLSE properly controls the PMD in coordination with the PON TC Framing Layer in combination with the MSE, thereby ensuring an ISOTDR, ISIL or ISOTDR-ISIL session can occur while normal user data traffic or services are maintained. This may require circuitry within the physical layer to ensure proper management of the bit clocks are maintained and to prevent false loss of clock events, which would cause false error events across the PON. A description of the required physical circuitry is discussed in further detail below.

Figure 5:
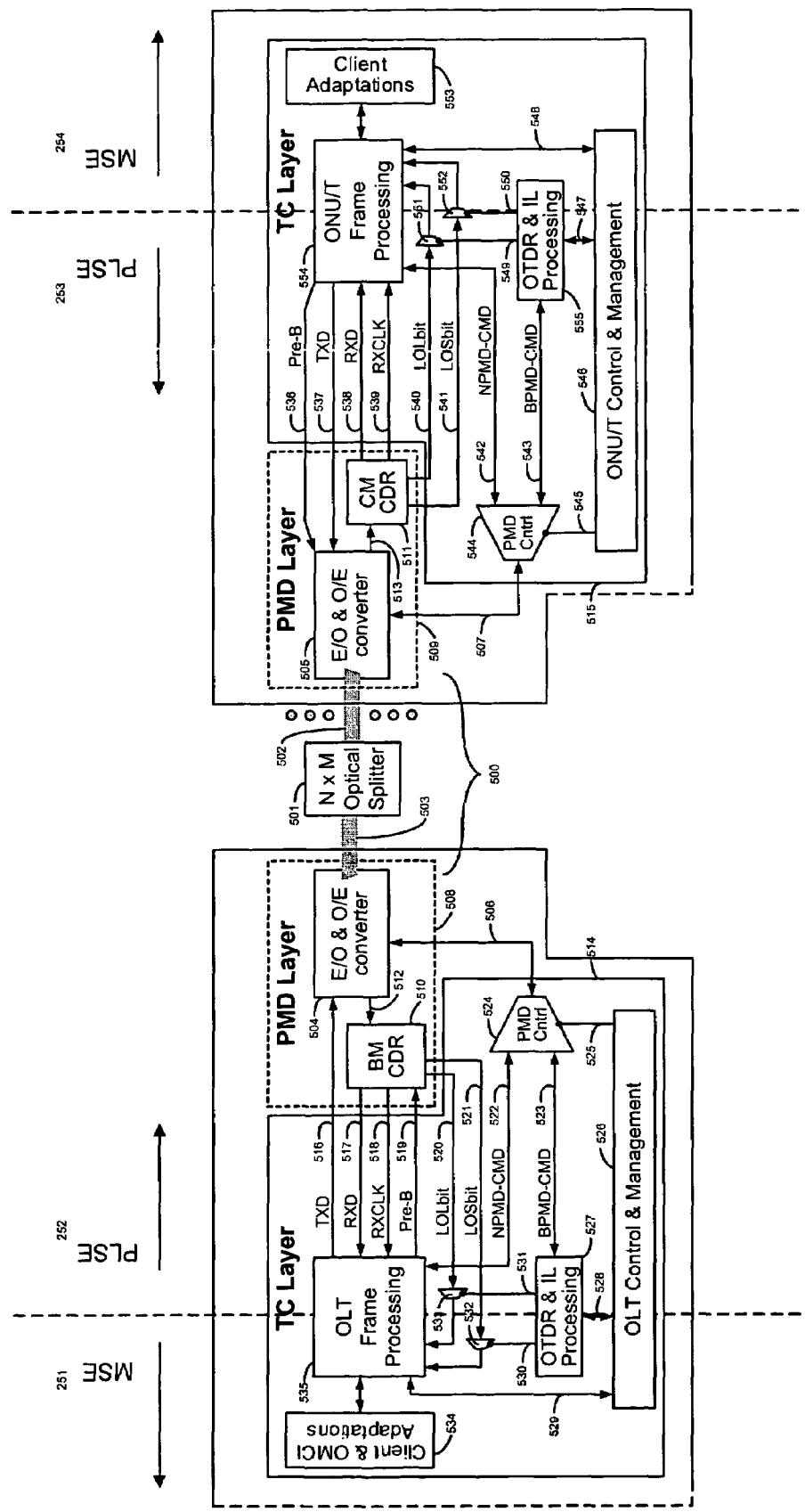
FIG. 5 illustrates circuitry and layers of a fiber optic data network in accordance with an embodiment of the present invention.

An embodiment of the required physical circuitry is disclosed with reference to FIG. 5. The PMD layer 508,509 consists of the transceivers 504,505 along with clock and data recovery (CDR) functionality 510,511. Non-correlated electrical receive energy is used as inputs to the CDR 512,513. The OLT receive path 512 is a burst mode type, whereas the ONU receive path 513 is a continuous mode type. Since burst mode circuitry typically requires an early indication that a burst is pending to facilitate and simplify bias control circuitry designs, the OLT Frame Processing block 535 generates a Pre-Burst (Pre-B) Indicator signal 519.

Figure 6:
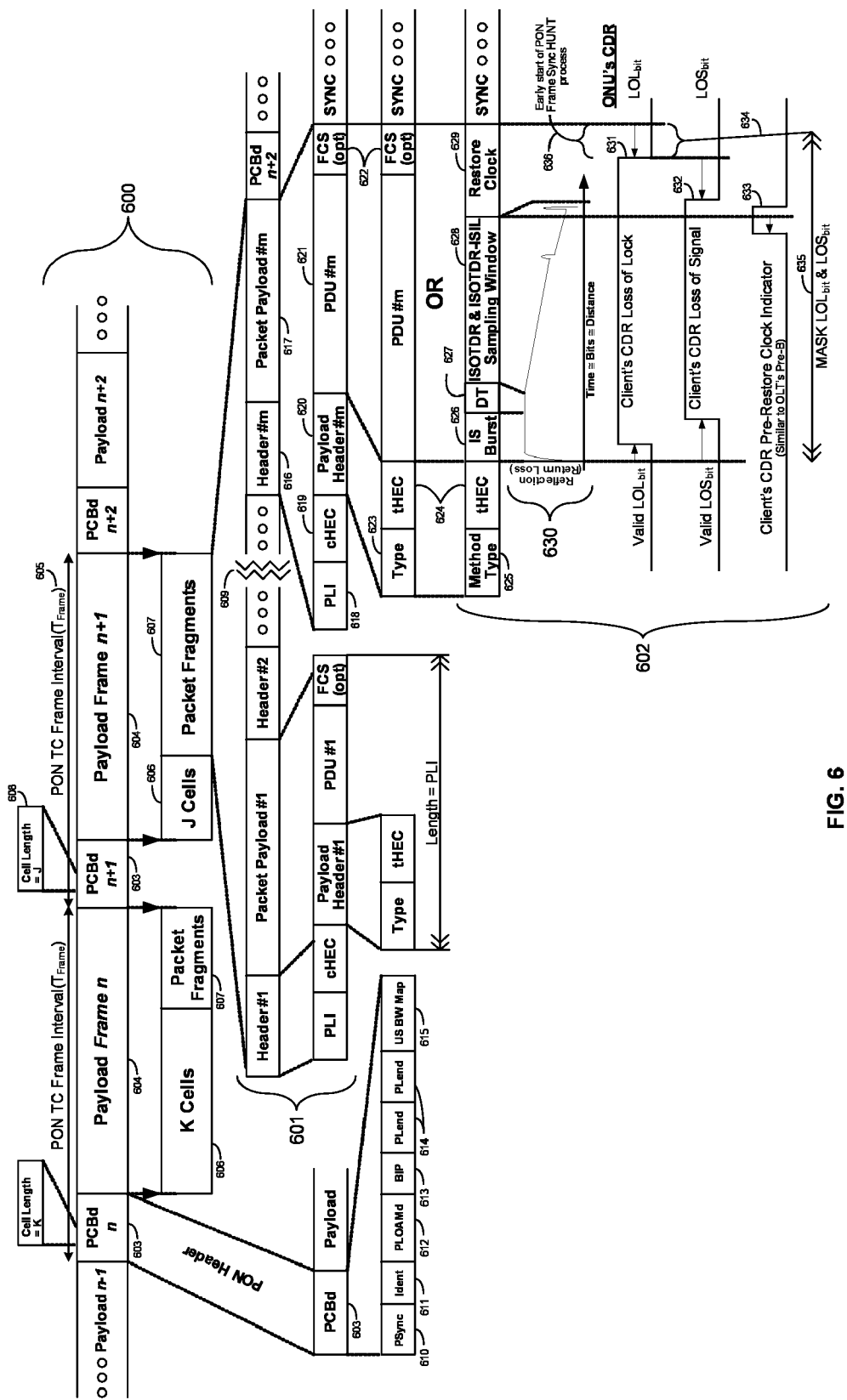
FIG. 6 illustrates a diagrammatic flow chart of the Downstream flow of information in a point-to-multipoint PON system in relation to an In-Service OTDR in accordance with an embodiment of the present invention.
Figure 7:
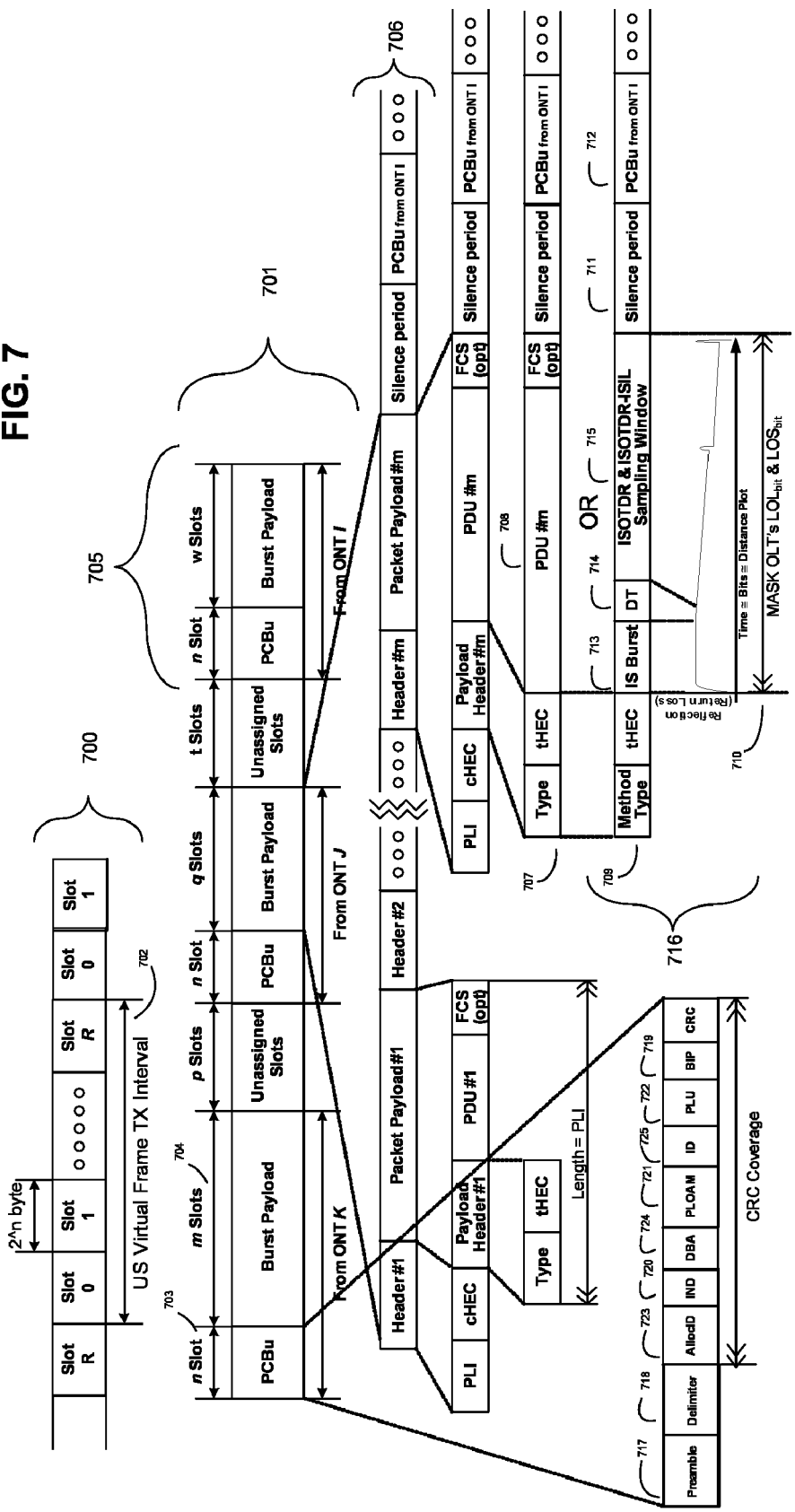
FIG. 7 illustrates a diagrammatic flow chart of the Upstream flow of information in a point-to-multipoint PON system in relation to an In-Service OTDR in accordance with an embodiment of the present invention.

As shown in FIG. 5, the Transmission Convergence (TC) layer 514,515 functions to process User incoming receive data (RXD) 517,538, which is synchronized with the receiver clock (RXCLK) 518,539 by the CDR 510,511, and to process outgoing transmit data (TXD) 516,537. The OLT also has specific control and management functions 526 that coordinate events within the OLT's TC layer 514. The OLT Framing process 535 performs all the downstream and upstream bit level packet formatting, which is shown in FIG. 6 and FIG. 7 and discussed in further detail below. The OLT Frame Processing block 535 manages several event indicators, such as generating the Pre-Burst (Pre-B) 519, managing the normal PMD command control (NPMD-CMD) 522 bus and interpreting Loss of Bit Lock ($LOL_{bit}$) 520 and Loss of Bit Signal ($LOS_{bit}$) 521, which initiates bit error management routines that may cause an interruption in service due to increased time taken to re-establish bit or frame synchronization.

To minimize the impact to services provided across a PON, it is beneficial to gate 532,533 these CDR state indicator signals (i.e., $LOL_{bit}$ 520 and $LOS_{bit}$ 521) so that bit error management routines are not falsely triggered. By ensuring proper masking of these CDR state indicator bits 520,521, an ISOTDR, ISIL or ISOTDR-ISIL method or event can occur with minimal to no impact to services deployed across a PON. Since a new functional block that coordinates and manages events outside the normal OLT Frame process is required, an OTDR & IL Processing block is needed. In addition, the ability to switch control over the PMD Layer 508 to the OTDR & IL Processing 527 block is also needed. This can be accomplished by muxing the PMD serial control bus 524 that still needs to be controlled through the overall OLT control & Management block 526. This PMD control signal 525 is generated or coordinated by the OLT control & Management block 526. In addition to the PMD control mux 524, the OLT control & management block 526 needs a communication bus between the OLT Frame Processing block 535 and the OTDR & IL Processing block 527.

By properly coordinating events, the OLT Control & Management block 526 can ensure an ISOTDR, ISIL or ISOTDR-ISL method is performed, while user data is processed by the OLT Frame Processing block 535, without interrupting normal data traffic. Proper event management is the key to enabling robust ISOTDgR, ISIL or ISOTDR-ISIL methods using the same transceivers 504,505 as the user data traffic. Proper event management is disclosed with reference to FIG. 6 and FIG. 7 and is discussed in further detail below.

Referring to FIG. 5, on the client or multipoint side of a PON system, similar event coordination by the ONU/T Control & Management block 546 is required to perform an ISOTDR, ISIL or ISOTDR-ISIL method for the Upstream direction. The ONU/T sub-system shown in FIG. 5 includes a similar set of functions found on the OLT to perform the ISOTDR, ISIL or ISOTDR-ISIL methods. The ONU/T Control & Management block 546 coordinates events between the ONU/T Frame Processing block 554 via signal 548, the OTDR & IL Processing block 555 via signal 547 and the PMD control bus mux 544 via signal 545. All ONU/T Transceiver 505 control is performed across the PMD serial control bus 507. The OTDR & IL Processing block 555 is the master of the Burst PMD command (BPMD-CMD) bus 543 and, similarly, the ONU/T Frame Processing block 554 is the master of the Normal PMD command (NPMD-CMD) bus 542. In addition to the BPMD-CMD bus, the OTDR & IL Processing block 555 is responsible for controlling or masking the ONU/T Continuous mode CDR 511 state indicators 540,541 via gating signals 549,550, which is also similar to the OLT's gating operation 532,533. The source clock signal from the ONU/T's CDR 511 generates the Loss of bit Lock ($LOL_{bit}$) 540 and Loss of bit Signal ($LOS_{bit}$) 541 signals and the ONU/T OTDR & IL Processing block 555 controls the $LOL_{bit}$ gate 551 and $LOS_{bit}$ gate 552 for the $LOL_{bit}$ 540 and $LOS_{bit}$ 541 signals. In summary, by coordinating the masking of the ONU/T's CDR 511 state indicators 540 & 541, the OTDR & IL Processing block 555 can perform an ISOTDR, ISIL or ISOTDR-ISIL method while ensuring minimal to no impact of the user Upstream services or data traffic flow, as discussed in further detail below and shown in FIG. 7.

The ONU/T Frame Processing block 554 performs similar functions as the OLT Framing Processing block 535. The main difference is on the client or multipoint side, burst and continuous mode of operations are reversed. In this regard, the ONU/T's transmit path (TXD) 537 behaves in a burst mode fashion with a Pre-Burst (Pre-B) indicator signal 536 controlling the behavior of the Upstream burst. The ONU/T's receive path is characterized by the receive data stream (RXD) 538 and recovered receive clock (RXCLK) 539. The ONU/T Frame Processing block 554 passes all user data to the Client Adaptation block 553. Inputs from the ONU/T's CDR bit states 540,541 are used to trigger resynchronization events, which need to be avoided during active ISOTDR, ISIL or ISOTDR-ISIL sessions by an appropriate gating mechanism. The $LOL_{bit}$ 540 and $LOS_{bit}$ 541 indicators and gating mechanism 551,552 are under the control of the OTDR & IL Processing block 555, similar to the OLT's OTDR & IL Processing block 527.

FIG. 6 illustrates an embodiment of a diagrammatic representation of the Downstream traffic flow which includes the multiplexing and framing of information in a point-to-multipoint PON system. The term downstream is meant to indicate information that originates at the OLT and terminates at an ONU/T. In general, the downstream PON frames 600 include a series of consecutive PON header sections 603 plus payload frame sections 604. The PON header is commonly referred to as the Physical Control Block Downstream (PCBd) 603 and typically includes synchronization 610; packet identification 611; downstream PLOAM 612; Bit Interleaved Parity (BIP) 613, which is used to determine the downstream's Bit Error Rate (BER); Payload Length 614; and the Upstream bandwidth assignment 615 fields. Some fields can be omitted, extra fields added and/or the field order altered, with the exception of synchronization.

Either cells or packets can be included in the Payload Frame section 604 section. Each PON TC downstream frame can have a fixed or variable frame interval 605 and the number of cells 606 or packets 607 can vary as well. Within the Packet Fragments segment 607 of the PON Payload Frame 604, a consecutive series 609 of packet header 616 and Packet payload 617 segments are aligned to fill the entire PON Payload segment. Typically, packet fragment payload 607 is sent before the start of the next PON frame 603, which is why the start of a PON header or PCB 603 begins with a synchronization of frame fields 610. By repeating the synchronization fields 610 in a predictable manner, the PON frame interval 605 ensures proper PON frame lock is maintained.

In general, the ISOTDR, ISIL or ISOTDR-ISIL methods adhere to and support a predictable PON frame alignment method. By taking advantage of the last packet fragment 602 before the beginning of the following PON Frame header 603, an ISOTDR, ISIL or ISOTDR-ISIL method can be performed in a manner that maintains the integrity of the PON frame. To insure proper identification of a pending ISOTDR, ISIL or ISOTDR-ISIL method, a special method type field 625 is used to inform all ONU/Ts of the pending ISOTDR, ISIL or ISOTDR-ISIL burst. Normally this Type field 623 is used to identify the type of Payload Data Unit (PDU) 621. Once the ONU/T receives an ISOTDR, ISIL or ISOTDR-ISIL method indication, then the ONU/T masks Loss of Bit Lock ($LOL_{bit}$) 631 and Loss of Bit Signal ($LOS_{bit}$) 632 to prevent false resynchronization events. To ensure proper resynchronization is maintained, the ONU/T's CDR can be given a pre restore clock pulse 633 that allows the CDR circuitry to normalize bias circuitry and establish a faster bit clock time and data lock time. The ONU/T's CDR require a good clock source in the data stream to restore the clock and, by providing a series of alternating 0s and 1s within the Restore Clock 629 field or another bit pattern that ensures the shortest clock and data recovery period possible, could perform a good restoring clock source function. The unmasking of the $LOL_{bit}$ 631 and $LOS_{bit}$ 632 is triggered only after the ONU/T's CDR 634 reestablishes both $LOL_{bit}$ 631 and $LOS_{bit}$ 632. Once both ONU/T CDR state indicator bits (i.e., $LOL_{bit}$ 631 and $LOS_{bit}$ 632) have regained lock, then the PON framing processing block can begin the PON frame synchronization hunt or search which marks the earliest time this HUNT state 636 can be performed.

The actual recording of measurements of an ISOTDR, ISIL or ISOTDR-ISIL method typically occurs after the configured IS Burst 626 and Delay Time (DT) 627 have passed. In addition, the coordination of events within the OTDR & IL Processing block 527 ensures that the recoding of measurements occurs within the allotted ISOTDR & ISOTDR-ISIL sampling window 628. By varying the bit width of the ISOTDR & ISOTDR-ISIL sampling window 628, a short or longer OTDR reflection period can be measured. Since the ISOTDR & ISOTDR-ISIL sampling window 628 is intended to sample a single reflection point, several method requests are performed to determine the reflection or return loss over time, which is the same as the number of bits at a given bit rate or distance the burst of light traveled to and from the reflection points along an optical fiber.

Referring to FIG. 4, the process of requesting the ISOTDR, ISIL or ISOTDR-ISIL methods, to ensure sufficient measurements are taken and gathered so that statistical analysis can be performed via the PLOAM or OMCI message fields 422 or 404, is the responsibility of the NCE. For remote operations, administration and management of an ISOTDR, ISIL or ISOTDR-ISIL session, OMCI messages 417 are communicated to the OTDR & IL Processing block 416. All event control to the PMD 431 that allows the ISOTDR, ISIL or ISOTDR-ISIL methods to be multiplexed with the normal PON traffic is processed locally within the OTDR & IL Processing block 416.

FIG. 7 illustrates an embodiment of a diagrammatic representation of the upstream traffic flow, which includes the multiplexing and framing of information in a point-to-multipoint PON system. The term upstream is meant to indicate information that originates at the ONU/T and terminates at an OLT. Since the upstream is shared by all ONU/T, the upstream is usually divided into slots 700, with each ONU/T sending its information over assigned slots in an upstream PON frame 701. A virtual upstream frame interval 702 typically includes information from a plurality of ONU/Ts. Since each ONU/T only sends data for a period of time, it is said to burst data to differentiate from the downstream continuous mode.

The PON header is usually referred to as the Physical Control Block Upstream (PCBu) 703 and typically includes fields of data that convey one or more of the following: preamble for synchronization 717; delimiter for packet identification 718; bit interleaved parity to determine upstream BER 719; indication field to provide real time status reports to the OLT 720; PLOAM 721; power leveling sequence used to adjust the ONU/T power levels and thereby reduce the dynamic range seen by OLT 722; ONU/T 725 and traffic 723 identifications; and traffic status or Dynamic Bandwidth Allocation DBA 724 of the ONU/T. Some fields can be omitted, extra fields added or the field order altered with the exception of preamble, which is needed to ensure proper clock recovery by a receiver. Either cells or Packets can be included in the Payload 704. Each PON TC upstream frame can include a fixed or variable frame interval 705 and the number of cells or packets can vary as well. Within the Payload, a consecutive series of packet header and packet payload segments 706 are aligned to fill the entire PON Payload segment.

The ISOTDR, ISIL or ISOTDR-ISIL methods adhere to and support the framing methods used by the upstream flow. By taking advantage of the last packet fragment of the Burst Payload 704, an ISOTDR, ISIL or ISOTDR-ISIL test method can be performed. To insure proper identification of a pending ISOTDR, ISIL or ISOTDR-ISIL method, a special method type field 709 is used to identify the scheduled method 716. Once the OLT receives an ISOTDR, ISIL or ISOTDR-ISIL event notification, then the OLT masks the Loss of Bit Lock ($LOL_{bit}$) and Loss of Bit Signal ($LOS_{bit}$) 710 to prevent false resynchronization events. The masking of $LOL_{bit}$ and $LOS_{bit}$ is typically triggered after the ONU/T has finished transmitting during the Silence period 711 and before another burst transmission by another ONU/T. The silence period is one or more unassigned slots and allows time for the burst mode CDR bias circuitry to reset for the next PCBu. Clock recovery is obtained in the normal PON process with the next PCBu 712.

The actual recording of measurements of an ISOTDR, ISIL or ISOTDR-ISIL method occurs after the configured IS Burst 713 and Delay Time (DT) 714 have passed, similar to the downstream case. The coordination of events within the OTDR & IL Processing block 555 ensures that the measurement occurs within the allotted ISOTDR & ISOTDR-ISIL sampling window 715. By varying the bit width of the ISOTDR & ISOTDR-ISIL sampling window, a shorter or longer OTDR reflection period can be measured. Since the ISOTDR & ISOTDR-ISIL sampling window is intended to sample a single reflection point, several method requests are typically performed to determine the reflection or return loss over time, which is the same as the number of bits at a given bit rate or distance the burst of light traveled to and from the reflection points along a fiber. The process of NCE requesting the ISOTDR, ISIL or ISOTDR-ISIL methods, so that sufficient measurements are taken and gathered for statistical analysis, can be done through the OLT by granting slot assignments to ONU/Ts for the methods as per the responsibility of the MSE.

For point-to-point wavelength division multiplexing fiber optic networks employing the ISOTDR, ISIL or ISOTDR-ISIL methods, both downstream and upstream communications operate in a continuous mode. This implies that point-to-point systems supporting ISOTDR, ISIL or ISOTDR-ISIL methods behave in a similar manner to the point-to-multipoint systems in the downstream direction. If the point-to-point line codes use control symbol characters to escape from normal data transfer operations, then a new control symbol character is required to multiplex an ISOTDR, ISIL or ISOTDR-ISIL method into the normal data traffic stream of a point-to-point system. A similar ISOTDR & ISOTDR-ISL packet 602 can be used in both directions for a point-to-point link. In general, the control symbol character is similar in function to the downstream packet header 616, as described herein for point-to-multipoint systems. In addition, all the processing of events described herein for the downstream direction of point-to-multipoint systems are also needed in point-to-point systems.

Results from ISOTDR, ISIL or ISOTDR-ISIL methods can be stored remotely and administered by the remote OMCI agent 404. In addition, the ONU/T's method results can be stored locally in the ONU/T equipment for comparison use by maintenance personnel in either point-to-point or point-to-multipoint systems. In addition, Service Providers or Broadband Operators can use ISOTDR, ISIL or ISOTDR-ISIL reports to optimally dispatch maintenance personnel and equipment. The financial benefits to Service Providers or Broadband Operators attributed to the ISOTDR, ISIL or ISOTDR-ISIL methods as described herein can be substantial.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A method for in-service testing of an optical network comprising:

receiving a request to perform an in-service test; and responsive to the request, multiplexing a test light transmission onto a data wavelength over a path from a first terminal in the network to a second terminal in the network in accordance with the network communication protocol of the network;

measuring a portion of the test light transmission; and disabling further light transmissions from the first terminal during a sampling window after the test light transmission, wherein the request indicates a duration of the sampling window;

wherein the multiplexing comprises multiplexing the test light transmission within a time slot corresponding to a portion of a frame of a communication protocol used by the first and second terminals, and the frame includes a field indicating a type of test associated with the test light transmission.

2. The method of claim 1, further comprising multiplexing a plurality of test light transmissions within a respective plurality of frames.

3. The method of claim 1, further comprising preventing or postponing resynchronization at the second terminal during reception of the portion of the frame.

4. The method of claim 1, wherein the transmitted light comprises one or more light pulses of desired wavelength, duration and intensity.

5. The method of claim 1, wherein measuring the portion of the test light transmission occurs at the first terminal.

6. The method of claim 1, wherein measuring the portion of the test light transmission occurs at the second terminal.

7. The method of claim 1, further comprising storing results of the in-service test.

8. The method of claim 7, further comprising comparing results of a new in-service test with previously stored results.

9. The method of claim 7, further comprising detecting fiber link tampering using the comparison of new and previously stored results.

10. The method of claim 7, further comprising analyzing the results to determine conditions of one or more fiber links and transceiver optical coupling efficiencies in the fiber optic network.

11. The method of claim 1, wherein the test light transmission is used to perform optical time domain reflectometry.

12. The method of claim 1, wherein the test light transmission is used to measure insertion loss.

13. A method for in-service testing of an optical network comprising:
multiplexing a test light transmission onto a data wavelength over a path from a first terminal in the network to a second terminal in the network in accordance with the network communication protocol of the network;
measuring a portion of the test light transmission; and
disabling further light transmissions from the first terminal during a sampling window after the test light transmission, wherein the duration of the sampling window is based at least in part on the distance of the path;
wherein the multiplexing comprises multiplexing the test light transmission within a time slot corresponding to a portion of a frame of a communication protocol used by the first and second terminals; and
the frame includes a field indicating a type of test associated with the test light transmission.

14. The method of claim 13, further comprising multiplexing a plurality of test light transmissions within a respective plurality of frames.

15. The method of claim 13, further comprising preventing or postponing resynchronization at the second terminal during reception of the portion of the frame.

16. The method of claim 13, wherein the transmitted light comprises one or more light pulses of desired wavelength, duration and intensity.

17. The method of claim 13, wherein measuring the portion of the test light transmission occurs at the first terminal.

18. The method of claim 13, wherein measuring the portion of the test light transmission occurs at the second terminal.

19. The method of claim 13, further comprising storing results of the in-service test.

20. The method of claim 19, further comprising comparing results of a new in-service test with previously stored results.

21. The method of claim 19, further comprising detecting fiber link tampering using the comparison of new and previously stored results.

22. The method of claim 19, further comprising analyzing the results to determine conditions of one or more fiber links and transceiver optical coupling efficiencies in the fiber optic network.

23. The method of claim 13, wherein the test light transmission is used to perform optical time domain reflectometry.

24. The method of claim 13, wherein the test light transmission is used to measure insertion loss.

25. A method for in-service testing of an optical network comprising:
multiplexing a test light transmission onto a data wavelength over a path from a first terminal in the network to a second terminal in the network in accordance with the network communication protocol of the network;
measuring a portion of the test light transmission;
disabling further light transmissions from the first terminal during a sampling window after the test light transmission; and
resuming light transmissions from the first terminal after the sampling window;
wherein the multiplexing comprises multiplexing the test light transmission within a time slot corresponding to a portion of a frame of a communication protocol used by the first and second terminals; and
the frame includes a field indicating a type of test associated with the test light transmission.

26. The method of claim 25, further comprising multiplexing a plurality of test light transmissions within a respective plurality of frames.

27. The method of claim 25, further comprising preventing or postponing resynchronization at the second terminal during reception of the portion of the frame.

28. The method of claim 25, wherein the transmitted light comprises one or more light pulses of desired wavelength, duration and intensity.

29. The method of claim 25, wherein measuring the portion of the test light transmission occurs at the first terminal.

30. The method of claim 25, wherein measuring the portion of the test light transmission occurs at the second terminal.

31. The method of claim 25, further comprising storing results of the in-service test.

32. The method of claim 31, further comprising comparing results of a new in-service test with previously stored results.

33. The method of claim 31, further comprising detecting fiber link tampering using the comparison of new and previously stored results.

34. The method of claim 31, further comprising analyzing the results to determine conditions of one or more fiber links and transceiver optical coupling efficiencies in the fiber optic network.

35. The method of claim 25, wherein the test light transmission is used to perform optical time domain reflectometry.

36. The method of claim 25, wherein the test light transmission is used to measure insertion loss.

37. An apparatus for in-service testing of an optical network comprising:
an optical transmitter used for data communications;
a control module configured to multiplex a test light transmission onto a data wavelength over a path from the optical transmitter to a first terminal in the network in accordance with the communication protocol of the network;
wherein the control module is configured to multiplex the test light transmission in response to a request to perform an in-service test and is further configured to disable further light transmissions from the optical transmitter during a sampling window after the test light transmission, wherein the request indicates a duration of the sampling window;
wherein the control module is configured to multiplex the test light transmission within a time slot corresponding to a portion of a frame of a communication protocol used by the control module and the first terminal and the control module is further configured to multiplex a plurality of test light transmissions within a respective plurality of frames; and wherein the frame includes a field indicating a type of test associated with the test light transmission.

38. The apparatus of claim 37, wherein the control module is further configured to multiplex a plurality of test light transmissions within a respective plurality of frames.

39. The apparatus of claim 37, wherein the test light transmission is used to perform optical time domain reflectometry.

40. The apparatus of claim 37, wherein the test light transmission is used to measure insertion loss.

41. An apparatus for in-service testing of an optical network comprising:
   an optical transmitter used for data communications; and
   a control module configured to multiplex a test light transmission onto a data wavelength over a path from the optical transmitter to a first terminal in the network in accordance with the communication protocol of the network;
   wherein the control module is further configured to disable further light transmissions from the optical transmitter during a sampling window after the test light transmission and the duration of the sampling window is based at least in part on the distance of the path;
   wherein the control module is configured to multiplex the test light transmission within a time slot corresponding to a portion of a frame of a communication protocol used by the control module and the first terminal; and
   wherein the frame includes a field indicating a type of test associated with the test light transmission.

42. The apparatus of claim 41, wherein the control module is further configured to multiplex a plurality of test light transmissions within a respective plurality of frames.

43. The apparatus of claim 41, wherein the test light transmission is used to perform optical time domain reflectometry.

44. The apparatus of claim 41, wherein the test light transmission is used to measure insertion loss.

45. An apparatus for in-service testing of an optical network comprising:
   an optical transmitter used for data communications; and
   a control module configured to multiplex a test light transmission onto a data wavelength over a path from the optical transmitter to a first terminal in the network in accordance with the communication protocol of the network;
   wherein the control module is configured to disable further light transmissions from the optical transmitter during a sampling window after the test light transmission and is further configured to resume light transmissions from the optical transmitter after the sampling window;
   wherein the control module is configured to multiplex the test light transmission within a time slot corresponding to a portion of a frame of a communication protocol used by the control module and the first terminal; and
   wherein the frame includes a field indicating a type of test associated with the test light transmission.

46. The apparatus of claim 45, wherein the control module is further configured to multiplex a plurality of test light transmissions within a respective plurality of frames.

47. The apparatus of claim 45, wherein the test light transmission is used to perform optical time domain reflectometry.

48. The apparatus of claim 45, wherein the test light transmission is used to measure insertion loss.

49. A system comprising:
   a first network terminal;
   a second network terminal;
   an optical network between the first network terminal and second network terminal; and
   a control module within one of the first and second network terminals configured to multiplex a test light transmission onto a data wavelength over a path from the first network terminal to the second network terminal in accordance with the communication protocol of the network while the network is in-service;
   wherein the control module is further configured to multiplex the test light transmission in response to a request to perform an in-service test and is further configured to disable further light transmissions from the first network terminal during a sampling window after the test light transmission, wherein the request indicates a duration of the sampling window;
   wherein the control module is configured to multiplex the test light transmission within a time slot corresponding to a portion of a frame of a communication protocol used by the first and second network terminals; and
   wherein the frame includes a field indicating a type of test associated with the test light transmission.

50. The system of claim 49, wherein the control module is further configured to multiplex a plurality of test light transmissions within a respective plurality of frames.

51. The system of claim 49, wherein the test light transmission is used to perform optical time domain reflectometry.

52. The system of claim 49, wherein the test light transmission is used to measure insertion loss.

53. A system comprising:
   a first network terminal;
   a second network terminal;
   an optical network between the first network terminal and second network terminal; and
   a control module within one of the first and second network terminals configured to multiplex a test light transmission onto a data wavelength over a path from the first network terminal to the second network terminal in accordance with the communication protocol of the network while the network is in-service;
   wherein the control module is configured to multiplex the test light transmission in response to a request to perform an in-service test and is further configured to disable further light transmissions from the first network terminal during a sampling window after the test light transmission and wherein the duration of the sampling window is based at least in part on the distance of the path;
   wherein the control module is configured to multiplex the test light transmission within a time slot corresponding to a portion of a frame of a communication protocol used by the first and second network terminals; and
   wherein the frame includes a field indicating a type of test associated with the test light transmission.

54. The system of claim 53, wherein the control module is further configured to multiplex a plurality of test light transmissions within a respective plurality of frames.

55. The system of claim 53, wherein the test light transmission is used to perform optical time domain reflectometry.

56. The system of claim 53, wherein the test light transmission is used to measure insertion loss.

57. A system comprising:
   a first network terminal;
   a second network terminal;
   an optical network between the first network terminal and second network terminal; and
   a control module within one of the first and second network terminals configured to multiplex a test light transmission onto a data wavelength over a path from the first network terminal to the second network terminal in accordance with the communication protocol of the network while the network is in-service;

wherein the control module is configured to multiplex the test light transmission in response to a request to perform an in-service test, is further configured to disable further light transmissions from the first network terminal during a sampling window after the test light transmission and is further configured to resume light transmissions from the first network terminal after the sampling window;

wherein the control module is configured to multiplex the test light transmission within a time slot corresponding to a portion of a frame of a communication protocol used by the first and second network terminals; and wherein the frame includes a field indicating a type of test associated with the test light transmission.

58. The system of claim 57, wherein the control module is further configured to multiplex a plurality of test light transmissions within a respective plurality of frames.

59. The system of claim 57, wherein the test light transmission is used to perform optical time domain reflectometry.

60. The system of claim 57, wherein the test light transmission is used to measure insertion loss.

61. An apparatus for in-service testing of an optical network comprising:

an optical fiber port;

a laser diode configured to transmit light representing network data communications into the optical fiber port;

a first photodetector configured to receive light from the optical fiber port;

a second photodetector positioned to receive light reflected back to the laser diode; and a control module configured to multiplex a test light transmission onto light from the laser diode over a path from the optical fiber port to a first terminal in the optical network in accordance with the communication protocol of the optical network;

wherein the control module is also configured to multiplex the test light transmission in response to a request to perform an in-service test and to disable further light transmissions from the laser diode during a sampling window after the test light transmission and the re-quest indicates a duration of the sampling window;

wherein the control module is configured to multiplex the test light transmission within a time slot corresponding to a portion of a frame of a communication protocol used by the control module and the first terminal; and wherein the frame includes a field indicating a type of test associated with the test light transmission.

62. The apparatus of claim 61, wherein the control module is further configured to multiplex a plurality of test light transmissions within a respective plurality of frames.

63. The apparatus of claim 61, wherein the transmitted light comprises one or more light pulses of desired wavelength, duration and intensity.

64. The apparatus of claim 61, wherein the test light transmission is used to perform optical time domain reflectometry.

65. The apparatus of claim 61, wherein the test light transmission is used to measure insertion loss.

66. An apparatus for in-service testing of an optical network comprising:

an optical fiber port;

a laser diode configured to transmit light representing network data communications into the optical fiber port;

a first photodetector configured to receive light from the optical fiber port;

a second photodetector positioned to receive light reflected back to the laser diode; and a control module configured to multiplex a test light transmission onto light from the laser diode over a path from the optical fiber port to a first terminal in the optical network in accordance with the communication protocol of the optical network;

wherein the control module is also configured to disable further light transmissions from the laser diode during a sampling window after the test light transmission and the duration of the sampling window is based at least in part on the distance of the path;

wherein the control module is configured to multiplex the test light transmission within a time slot corresponding to a portion of a frame of a communication protocol used by the control module and the first terminal; and wherein the frame includes a field indicating a type of test associated with the test light transmission.

67. The apparatus of claim 66, wherein the control module is further configured to multiplex a plurality of test light transmissions within a respective plurality of frames.

68. The apparatus of claim 66, wherein the transmitted light comprises one or more light pulses of desired wavelength, duration and intensity.

69. The apparatus of claim 66, wherein the test light transmission is used to perform optical time domain reflectometry.

70. The apparatus of claim 66, wherein the test light transmission is used to measure insertion loss.

71. An apparatus for in-service testing of an optical network comprising:

an optical fiber port;

a laser diode configured to transmit light representing network data communications into the optical fiber port;

a first photodetector configured to receive light from the optical fiber port;

a second photodetector positioned to receive light reflected back to the laser diode; and a control module configured to multiplex a test light transmission onto light from the laser diode over a path from the optical fiber port to a first terminal in the optical network in accordance with the communication protocol of the optical network;

wherein the control module is also configured to disable further light transmissions from the laser diode during a sampling window after the test light transmission and to resume light transmissions from the laser diode after the sampling window;

wherein the control module is configured to multiplex the test light transmission within a time slot corresponding to a portion of a frame of a communication protocol used by the control module and the first terminal; and wherein the frame includes a field indicating a type of test associated with the test light transmission.

72. The apparatus of claim 71, wherein the control module is further configured to multiplex a plurality of test light transmissions within a respective plurality of frames.

73. The apparatus of claim 71, wherein the transmitted light comprises one or more light pulses of desired wavelength, duration and intensity.

74. The apparatus of claim 71, wherein the test light transmission is used to perform optical time domain reflectometry.

75. The apparatus of claim 71, wherein the test light transmission is used to measure insertion loss.

* * * * *